United States Patent
Fukushima et al.

(10) Patent No.: US 11,501,891 B2
(45) Date of Patent: Nov. 15, 2022

(54) WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Daichi Fukushima, Mie (JP); Makoto Higashikozono, Mie (JP); Housei Mizuno, Mie (JP); Miyu Aramaki, Mie (JP); Kyousyou Kou, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/268,805

(22) PCT Filed: Aug. 6, 2019

(86) PCT No.: PCT/JP2019/030894
§ 371 (c)(1),
(2) Date: Feb. 16, 2021

(87) PCT Pub. No.: WO2020/039914
PCT Pub. Date: Feb. 27, 2020

(65) Prior Publication Data
US 2021/0358655 A1 Nov. 18, 2021

(30) Foreign Application Priority Data

Aug. 22, 2018 (JP) .............................. JP2018-155666
Apr. 8, 2019 (JP) .............................. JP2019-073722

(51) Int. Cl.
H01B 7/08 (2006.01)
H01B 7/00 (2006.01)
H01B 7/02 (2006.01)

(52) U.S. Cl.
CPC .......... *H01B 7/0009* (2013.01); *H01B 7/0216* (2013.01); *H01B 7/08* (2013.01); *H01B 7/0807* (2013.01); *H01B 7/0876* (2013.01)

(58) Field of Classification Search
CPC .......... H01B 7/02; H01B 7/04; H01B 7/0045; H01B 7/08; H01B 7/0807; H01B 7/0876; H01B 11/02; H01B 11/04
(Continued)

(56) References Cited

U.S. PATENT DOCUMENTS 4,486,619 A * 12/1984 Trine .................... H01B 7/0876
174/34
5,268,531 A * 12/1993 Nguyen ............... H01B 7/0861
156/55
(Continued)

FOREIGN PATENT DOCUMENTS

CN 205050607 2/2016
CN 207097529 3/2018
(Continued)

OTHER PUBLICATIONS

International Search Report issued in Patent Application No. PCT/JP2019/030894, dated Oct. 8, 2019 and English language translation thereof.
(Continued)

*Primary Examiner* — William H. Mayo, III
(74) *Attorney, Agent, or Firm* — Greenblum & Bernstein, P.L.C.

(57) ABSTRACT

A plurality of wire-like transmission members is easily fixed to a base member. The wiring member includes an
(Continued)

assembled wire made up of a plurality of bundled wire-like transmission members and a base member in which the assembled wire is fixed on the main surface.

9 Claims, 6 Drawing Sheets

(58) Field of Classification Search
USPC ....... 174/110 R, 113 R, 113 A, 117 R, 117 F, 174/117 FF, 117 M, 128.1, 128.2, 129 R, 174/72 R, 74 R
See application file for complete search history.

(56) References Cited

U.S. PATENT DOCUMENTS

| | | | |
|---|---|---|---|
| 5,502,287 A * | 3/1996 | Nguyen | ............... H01B 7/0838 156/53 |
| 10,734,134 B2 | 8/2020 | Mizuno et al. | |
| 2020/0328008 A1 | 10/2020 | Mizuno et al. | |

FOREIGN PATENT DOCUMENTS

| | | |
|---|---|---|
| JP | 58-192408 | 12/1983 |
| JP | 2010-27242 | 2/2010 |
| JP | 2015-220881 | 12/2015 |
| JP | 2016-100200 | 5/2016 |
| JP | 2018-85321 | 5/2018 |

OTHER PUBLICATIONS

Written Opinion issued in Patent Application No. PCT/JP2019/030894, dated Oct. 8, 2019.
International Preliminary Report on Patentability in Patent Application No. PCT/JP2019/030894, dated Feb. 19, 2020 and English language translation thereof.
China Office Action issued in CN Application No. 201980052270.8, dated Dec. 21, 2021.
China Official Action received in CN Application No. 201980052270.8, dated Apr. 14, 2022.
Japan Official Action received in JP Application No. 2019-073722, dated May 31, 2022.
Chinese Refusal Decision issued in Chinese Patent Application No. 20198052270.8, dated Jul. 26, 2022 with machine English translation.

* cited by examiner

WIRING MEMBER

TECHNICAL FIELD

The present invention relates to a wiring member.

BACKGROUND ART

Patent Document 1 discloses a configuration that covering wires are arranged in parallel with each other on a soft resin sheet. A stitching means and a pressurized heating welding means, for example, are disclosed as a means of bonding the covering wires and the soft resin sheet.

PRIOR ART DOCUMENTS

Patent Documents

Patent Document 1: Japanese Utility Model Application Laid-Open No. 58-192408

SUMMARY

Problem to be Solved by the Invention

However, according to the technique disclosed in Patent Document 1, the covering wire needs to be bonded to the soft resin sheet one by one when the plurality of covering wires are arranged on the soft resin sheet. Thus, there is a large work burden for bonding the plurality of covering wires to the soft resin sheet.

An object of the present invention is to provide a technique of easily fixing a plurality of wire-like transmission members to a base member.

Means to Solve the Problem

A wiring member according to the present disclosure is a wiring member including an assembled wire made up of a plurality of wire-like transmission members which are bundled and a base member in which the assembled wire is fixed to a main surface.

Effects of the Invention

According to the present disclosure, the plurality of wire-like transmission members can be fixed to the base member easily.

DESCRIPTION OF EMBODIMENT(S)

Description of Embodiment of Present Disclosure

Embodiments of the present disclosure are listed and described firstly.

A wiring member according to the present disclosure is as follows.

(1) A wiring member according to the present disclosure is a wiring member including an assembled wire made up of a plurality of wire-like transmission members which are bundled and a base member in which the assembled wire is fixed to a main surface. When the assembled wire is fixed to the base member, the plurality of wire-like transmission members can be fixed to the base member. Thus, the plurality of wire-like transmission members can be fixed to the base member easily.

(2) The assembled wire may be a twisted wire made up of the plurality of wire-like transmission members which are stranded, and at least one of the plurality of wire-like transmission members may be fixed on the main surface of the base member. When at least one of the plurality of wire-like transmission members is fixed to the main surface of the base member, the plurality of wire-like transmission members can be fixed to the base member.

(3) A total thickness dimension in a portion where the plurality of wire-like transmission members are stacked may be smaller than a sum of an initial thickness dimension of the base member and a dimension obtained by multiplying an initial diameter dimension of one of the plurality of wire-like transmission members by a total number of the plurality of wire-like transmission members which have been stacked. Accordingly, a thickness dimension of the wiring member is reduced.

(4) A total thickness dimension in a portion where the plurality of wire-like transmission members are stacked may be larger than a sum of an initial thickness dimension of the base member and an initial diameter dimension of one of the plurality of wire-like transmission members. Accordingly, the wire-like transmission members can be prevented from being excessively crushed.

(5) The wiring member may include, in the portion where the plurality of wire-like transmission members are stacked, a base side fixing part in which a portion of the plurality of wire-like transmission members having contact with the base member is fixed to the base member. The base member and the wire-like transmission member are stably fixed to each other easily. When, in the portion where the plurality of wire-like transmission members are stacked, the portion of the plurality of wire-like transmission members having contact with the base member is fixed to the base member in the base side fixing part, the plurality of wire-like transmission members can be stably fixed to the base member easily.

(6) In the base side fixing part, the base member may be deformed more than the portion of the plurality of wire-like transmission members having contact with the base member. Accordingly, the wire-like transmission member is kept in the original state as much as possible.

(7) In the base side fixing part, the portion of the plurality of wire-like transmission members having contact with the base member may be deformed more than the base member. Accordingly, the base member is kept in the original state as much as possible.

(8) The wiring member may include a stacked fixing part in which the plurality of wire-like transmission members are fixed to each other in the portion where the plurality of wire-like transmission members are stacked. The plurality of wire-like transmission members are also fixed by the stacked fixing part in the portion where the plurality of wire-like transmission members are stacked, thus the plurality of wire-like transmission members can be fixed to the base member more reliably.

(9) The plurality of wire-like transmission members may include an electrical wire having a core wire and a covering around the core wire, and the core wire may have a shape flatter than the other portion in the portion where the plurality of wire-like transmission members are stacked. Accordingly, a thickness dimension of the wiring member is reduced.

(10) The wiring member may include a horizontal fixing part in which the plurality of wire-like transmission members are fixed to the base member in a portion where the plurality of wire-like transmission members are arranged side by side. The plurality of wire-like transmission members are fixed to the base member in the horizontal fixing part in the portion where the plurality of wire-like transmission members are arranged side by side, thus the plurality of wire-like transmission members can be fixed to the base member more reliably.

(11) A thickness dimension largest in the horizontal fixing part in the base member may be larger than an initial thickness dimension of the base member. Accordingly, the horizontally-arranged portion is easily fixed to the base member. A fixing strength of the whole wire-like transmission member to the base member is increased.

(12) A lateral part of the main surface of the base member with respect to one of the wire-like transmission member may be concaved. The concave portion in the lateral part of the base member with respect to the wire-like transmission member is brought close to the horizontal fixing part, thus a volume of the horizontal fixing part is largely increased.

(13) The assembled wire may further include a covering member covering the plurality of wire-like transmission members, and the covering member may be fixed on the main surface of the base member. The plurality of wire-like transmission members are covered by the covering member, thereby being bundled, thus when the covering member is fixed to the base member, the plurality of wire-like transmission members can be fixed to the base member easily.

Details of Embodiment of Present Disclosure

Specific examples of a wiring member of the present disclosure are described hereinafter with reference to the drawings. The present invention is not limited to these examples, but is indicated by claims, and it is intended that meanings equivalent to claims and all modifications within a scope of claims are included.

Embodiment 1

Figure 1:
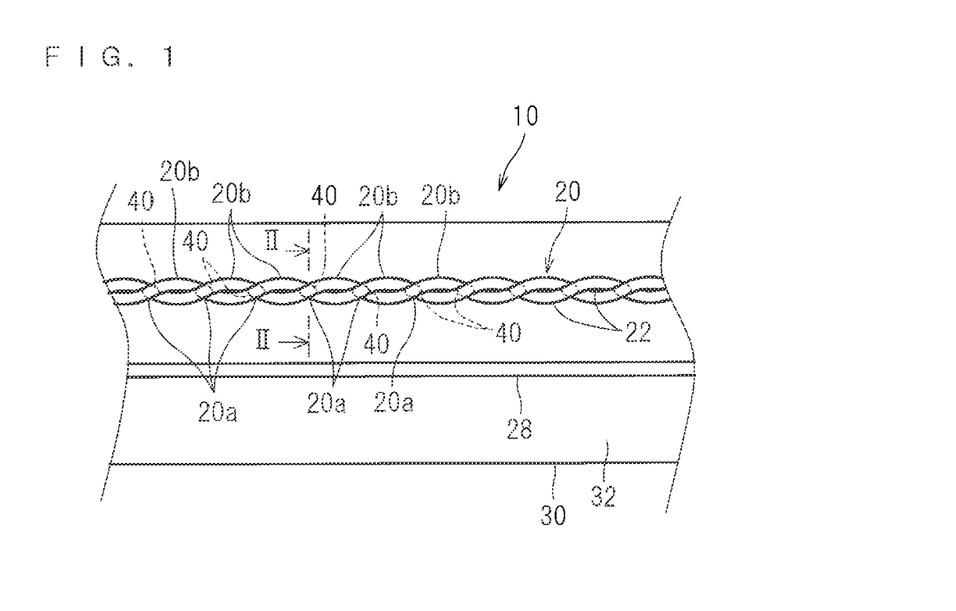
FIG. 1 is a schematic plan view illustrating a wiring member according to an embodiment 1.
Figure 2:
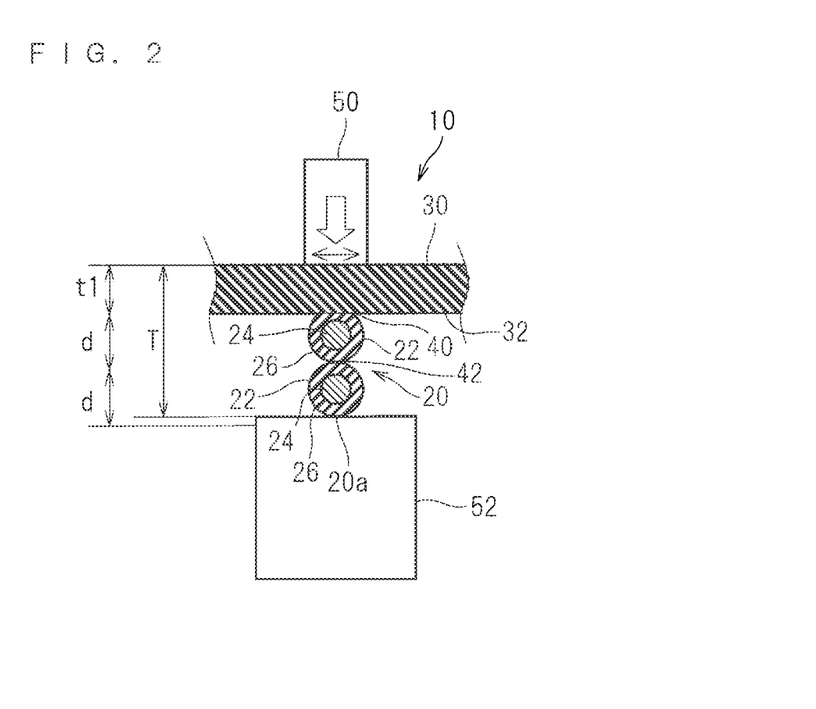
FIG. 2 is a schematic cross-sectional view along a II-II line in FIG. 1.

A wiring member according to an embodiment 1 is described hereinafter. FIG. 1 is a schematic plan view illustrating a wiring member 10, and FIG. 2 is a schematic cross-sectional view along a II-II line in FIG. 1. FIG. 2 illustrates a horn 50 and an anvil 52 for ultrasonic-welding an electrical wire 22 to a sheet member which is an example of a base member.

The wiring member 10 includes an assembled wire 20 and a base member 30.

The assembled wire 20 is made up of a plurality of bundled wire-like transmission members 22.

It is sufficient that the wire-like transmission member 22 is a wire-like member transmitting electrical power or light. For example, the wire-like transmission member 22 may be a general wire having a core wire and a covering around the core wire, or may also be a shielded wire, an enamel wire, a nichrome wire, or an optical fiber. The wire-like transmission member transmitting the electricity may be various kinds of signal lines or various kinds of power lines. The wire-like transmission member transmitting the electricity may be used as an antenna or coil, for example, transmitting or receiving a signal or electrical power to or from a space.

In the description herein, the wire-like transmission member 22 is a general wire 22 (simply referred to as the electrical wire 22 hereinafter). The electrical wire 22 includes a core wire 24 as a transmission wire body and an insulating covering 26 as a covering 26 for covering the core wire 24. Each description on the electrical wire 22 is applicable to the wire-like transmission member 22 except for a configuration to which the description is not applicable.

The core wire 24 is made up of one or a plurality of strands. The strand is formed of a conductor made of copper, copper alloy, aluminum, or aluminum alloy, for example. When the core wire 24 is made up of the plurality of strands, the plurality of strands may be stranded. The insulating covering 26 is formed of a resin material such as polyvinyl chloride (PVC) or polyethylene (PE) extrusion-molded around the core wire 24. Herein, the electrical wire 22 is a so-called round wire having a round shape in cross section.

The assembled wire 20 is made up of a plurality of bundled wire-like transmission members 22 (a plurality of electrical wires 22 herein).

A configuration for bundling the plurality of electrical wires 22 is optionally determined. Applicable is any configuration of bundling the plurality of electrical wires 22 so that the electrical wires 22 have a wire like form.

For example, it is sufficient that the plurality of electrical wires 22 are bundled like a wire without using the other member. Assumed as this configuration is that the plurality of electrical wires 22 are stranded or braided, for example.

The plurality of electrical wires 22 may be bundled like a wire using the other member. Assumed as this embodiment is a configuration that an outer periphery of the plurality of electrical wires 22 assembled like a wire are covered by a covering member, for example. The covering member may be an extrusion-covering around the plurality of electrical wires 22, an adhesive tape wound around the plurality of electrical wires 22, or a tube member such as a corrugated tube externally mounted around the plurality of electrical wires 22. In this case, a configuration of fixing the assembled wire to the base member is described in an embodiment 3.

In the description herein, the assembled wire 20 is a twisted wire 20 made up of a plurality of stranded electrical wires 22. Each description on the twisted wire 20 is applicable to the general assembled wire 20 except for a configuration to which the description is not applicable. Herein, the twisted wire 20 is made up of two stranded electrical wires 22, however, the twisted wire 22 made up of three or more stranded electrical wires 22 is also applicable. The twisted wire 20 is hardly influenced by noise, thus is appropriate for signal transmission. However, the twisted wire 20 may also be used as a power line.

The base member 30 is a member in which the twisted wire 20 is fixed on a main surface 32. The twisted wire 20 is fixed on the main surface 32, thus the twisted wire 20 is held along a predetermined route on the main surface 32. That is to say, the base member 30 is a member having the main surface 32 holding the twisted wire 20 along the predetermined route. It is sufficient that the base member 30 is a member having the main surface 32 for fixing the twisted wire 20 as described above, thus may be formed into a sheet-like shape or a three-dimensional shape.

In the description herein, the base member 30 is a member having a flat part, more specifically, a sheet member 30 which can be bent in some cases. Each description on the sheet member 30 is applicable to the base member except for a configuration to which the description is not applicable.

A material constituting the sheet member 30 is not particularly limited, however, the sheet member 30 is preferably formed of a material containing a resin of polyvinyl chloride (PVC), polyethylene terephthalate (PET), or polypropylene (PP). The sheet member 30 may be a sheet material with an inner portion evenly filled or a non-woven sheet, for example. The sheet member 30 may contain a material such as metal. The sheet member 30 preferably has flexibility of easily bending in a thickness direction. The sheet member 30 may be a single layer or may be a plurality of stacked layers. When the sheet member 30 is the plurality of stacked layers, it is considered that a resin layer and a resin layer are stacked, for example. It is also considered that a resin layer and a metal layer are stacked, for example.

In the present embodiment, an additional wire-like transmission member 28 is fixed on the main surface 32 in addiction to the twisted wire 20 described above. The additional wire-like transmission member 28 may be a wire-like member transmitting electricity or light, for example, as with the wire-like transmission member 22, or may also be a member similar to the twisted wire 20. In the description herein, the additional wire-like transmission member 28 is a general wire 28 (simply referred to as the electrical wire 28 hereinafter). Each description on the electrical wire 28 is applicable to the additional wire-like transmission member 28 except for a configuration to which the description is not applicable.

The electrical wire 28 is also fixed on the main surface 32. Herein, the electrical wire 28 is fixed to the main surface 32 in parallel with the twisted wire 20. The electrical wire 28 and the twisted wire 20 may be branched halfway through and fixed along separate routes. The whole electrical wire 28 and the whole twisted wire 20 may be fixed along separate routes on the main surface 32.

Based on an assumption of the configuration that the twisted wire 20 and the electrical wire 28 are fixed on the main surface 32, the base member 30 can be considered a member keeping at least one twisted wire 20 and at least one electrical wire 28 (additional wire-like transmission member 28) in a flat state on the main surface 32. Assumed furthermore is a configuration that the base member 30 has a flat part and at least one twisted wire 20 and at least one electrical wire 28 (additional wire-like transmission member 28) are fixed on a main surface of the flat part. In this case, the wiring member 10 can be considered a wiring member including a flat part keeping the twisted wire 20 and the electrical wire 28 (additional wire-like transmission member 28) in a flat state. Furthermore, the base member 30 is assumed to be a sheet member which can be bent. In this case, the wiring member 10 can be considered a flat wiring member keeping the twisted wire 20 and the electrical wire 28 (additional wire-like transmission member 28) in a flat state, and is a wiring member which can be deformed in accordance with a shape of a surface on which the wiring member 10 is to be disposed.

The plurality of additional wire-like transmission members 28 may be fixed on the main surface 32, or may also be omitted.

A configuration of fixing the twisted wire 20 on the main surface 32 of the base member 30 (the sheet member herein) is described.

At least one of the plurality of electrical wires 22 included in the twisted wire 20 is fixed on the main surface 32 of the base member 30. Only some (for example, one) of the plurality of electrical wires 22 may be fixed on the main surface 32 of the base member 30, or all of the plurality of electrical wires 22 may be fixed on the main surface 2 of the base member 30. The plurality of electrical wires 22 are stranded, thus when some (for example, one) of the plurality of electrical wires 22 included in the twisted wire 20 are fixed on the main surface 32 of the base member 30, the remaining electrical wire 22 stranded with some (for example, one) of the electrical wires 22 fixed on the main surface of the base member 30 is also fixed on the main surface 32 of the base member 30 via some (for example, one) of the electrical wires 22.

Applicable as the configuration of fixing at least one of the plurality of electrical wires 22 included in the twisted wire 20 on the main surface 32 of the base member 30 (sheet member) is a contact area fixation and a non-contact area fixation, or both fixations may be used together. Herein, the contact area fixation indicates that a portion where the electrical wire 22 and the sheet member 30 have contact with each other is stuck and fixed. At least one of the plurality of electrical wires 22 included in the twisted wire 20 may be solely fixed to the sheet member 30 by the contact area fixation, or fixed to the sheet member 30 in a collected form (refer to the embodiment 3) by the contact area fixation. The non-contact area fixation indicates the fixing state which is not the contact area fixation. For example, a sewing thread, the other sheet material, or an adhesive tape presses the electrical wire 22 toward the sheet member 30. A sewing thread, the other sheet material, or an adhesive tape surrounds the wire-like transmission member (electrical wire) and the sheet member, thereby holding the wire-like transmission member (electrical wire) and the sheet member. The non-contact area fixation indicates that the electrical wire 22 and the sheet member 30 in the state described above are kept fixed. At least one of the plurality of electrical wires 22 included in the twisted wire 20 may be solely fixed to the sheet member 30 by the non-contact area fixation, or fixed to the sheet member 30 in a collected form by the non-contact area fixation.

In the description hereinafter, the electrical wire 22 and the sheet member are in the state of the non-contact area fixation. Each description on the contact area fixation is also applicable to the non-contact area fixation as long as each member and material has a configuration to which the non-contact area fixation is applicable.

Applicable as the configuration of the contact area fixation are a contact area indirect fixation and a contact area direct fixation, or both fixations may also be used together in different regions. Herein, the contact area indirect fixation indicates that the electrical wire 22 and the sheet member 30 are indirectly stuck and fixed via an intervening member such as an adhesive agent, a pressure-sensitive adhesive agent, and a double-sided adhesive tape provided therebetween. The contact area direct fixation indicates that the electrical wire 22 and the sheet member 30 are directly stuck and fixed without an intervention of the adhesive agent, for example, which is separately provided. Considered in the contact area direct fixation is that resin included in at least one of the electrical wire 22 and the sheet member 30 is melted, thus the electrical wire 22 and the sheet material 30 are stuck and fixed, for example. In the description hereinafter, the electrical wire 22 and the sheet member 30 are in the state of the contact area direct fixation. Each description on the contact area direct fixation is also applicable to the contact area indirect fixation as long as each member and material has a configuration to which the contact area indirect fixation is applicable.

In forming the state of such a contact area direct fixation, the resin is considered to be melted by heat or a solvent, for example. That is to say, the state of the contact area direct fixation may be the state of the contact area direct fixation by the heat or the state of the contact area direct fixation by the solvent. The contact area direct fixation by the heat is preferable.

At this time, a means of forming the state of the contact area direct fixation is not particularly limited, but various means including a known means such as welding, fusion, and melting joint can be used. For example, when the state of the contact area direct fixation by the heat is formed by welding, various welding means such as ultrasonic welding, heating-pressurizing welding, hot air welding, and high frequency welding can be adopted. When the state of the contact area direct fixation is formed by these means, the electrical wire 22 and the base member 30 are in the state of the contact area direct fixation by these means. Specifically, when the state of the contact area direct fixation is formed by the ultrasonic welding, for example, the electrical wire 22 and the sheet member 30 are in the state of the contact area direct fixation by the ultrasonic welding. A portion where the state of the contact area direct fixation by the heat is formed by the welding (a fixing portion between the electrical wire 22 and the sheet member 30) may be referred to as a welding part, and herein, the fixing portion by the ultrasonic welding may be referred to as an ultrasonic welding part, and the fixing portion by the heating-pressurizing welding may be referred to as a heating-pressurizing welding part, for example.

In the case of the contact area direct fixation, only the resin included in the covering of the electrical wire 22 may be melted, or only the resin included in the sheet member 30 may be melted. In these cases, the resin which has been melted is stuck on an outer surface of the resin on the other side, and a relatively clear interface may be formed in some cases. In the case of the contact area direct fixation, both the resin included in the covering of the electrical wire 22 and the resin included in the sheet member 30 may be melted. In this case, there may be a case where both the resins are mixed and a clear interface is not be formed. Particularly, when the covering of the electrical wire 22 and the sheet member 30 include compatible resin such as the same resin material, for example, there may be a case where both the resins are mixed and a clear interface is not be formed.

In the description herein, the electrical wire 22 and the sheet member 30 are ultrasonic-welded. Each description on the electrical wire 22 and the sheet member 30 is applicable to various fixation as long as each member and material has a configuration to which the above fixation is applicable.

That is to say, the wiring member 10 includes, in a portion where the plurality of electrical wires 22 are stacked on the main surface 32 of the sheet member 30, a base side fixing part 40 in which a portion of the plurality of electrical wires 22 having contact with the sheet member 30 (base member) is fixed to the base member 30.

More specifically, the twisted wire 20 is disposed along the main surface 32 of the sheet member 30, thus when the wiring member 10 is observed from a direction perpendicular to the main surface 32, there are a stacked part 20a in which the plurality of electrical wires 22 intersect with each other and stacked on the main surface 32 of the sheet member 30 and a parallel part 20b in which the plurality of electrical wires 22 are disposed in a parallel state, the stacked part 20a and the parallel part 20b extending alternately on the main surface 32.

In the stacked part 20a described above, the electrical wire 22 closer to the main surface 32 of the sheet member 30 is fixed to the sheet member 30, thus the base side fixing part 40 is formed.

The base side fixing part 40 can be formed by sandwiching the sheet member 30 and the twisted wire 20 between a horn 50 and an anvil 52 for ultrasonic welding to supply ultrasonic vibration energy in the stacked part 20a and melting the resin in at least one of the electrical wire 22 and the sheet member 30 to fix the electrical wire 22 and the sheet member 30, for example. That is to say, the base side fixing part 40 is also an ultrasonic welding part.

A positional relationship of the horn 50 and the anvil 52 with the sheet member 30 and the twisted wire 20 is optional set. It is also applicable that the horn 50 supplying the ultrasonic vibration is provided closer to the sheet member 30 and the anvil 52 is disposed closer to the twisted wire 20. Accordingly, the ultrasonic vibration energy is effectively transmitted between the sheet member 30 and the electrical wire 22, and the sheet member 30 and the electrical wire 22 can be reliably bonded. One of the horn 50 and the anvil 52 may be pressurized, or both of them may be pressurized. When the horn 50 or the anvil 52 is pressurized from a side of the sheet member 30, a pressurized portion of a lower surface of the sheet member 30 may be partially concaved.

The plurality of electrical wires 22 are stacked in the stacked part 20a described above, thus the twisted wire 20 protrudes the most from the main surface 32 in the stacked part 20a. Thus, the horn 50 and the anvil 52 can easily sandwich and pressurize the twisted wire 20 and the sheet member 30. Thus, the stacked part 20a is appropriate as a portion on which the welding by pressure, particularly, the ultrasonic welding is performed.

Furthermore, the plurality of electrical wires 22 intersect with each other in the stacked part 20a, thus a stacked state of the plurality of electrical wires 22 hardly breaks up in the state where the horn 50 and the anvil 52 sandwich the twisted wire 20 and the sheet member 30. Accordingly, a distance between conductors of the twisted wire 20 is stabilized and a pitch of strand is stabilized, thus an excellent signal transmission performance can be achieved. Thus, the stacked part 20a is also appropriate for applying pressure to press the electrical wire 22 having contact with the main surface 32 and the sheet member 30 against each other via the electrical wire 22 farther away from the main surface 32.

The plurality of stacked parts 20a are linearly provided side by side at intervals in an extension direction of the twisted wire 20. It is also applicable that the base side fixing part 40 is formed in only one of the plurality of stacked parts 20a or in two or more of the plurality of stacked parts 20a. In the latter case, it is also applicable that the base side fixing part 40 is continuously provided in the plurality of stacked parts 20a without an intervention of a portion where the base side fixing part 40 is not provided (for example, when all the plurality of stacked parts 20*a* are welded), or the base side fixing part 40 is provided for each of the plurality of stacked parts 20*a* (for example, when the welding is performed on every two or three stacked parts 20*a* in the plurality of stacked parts 20*a*). FIG. 1 illustrates a configuration where the base side fixing part 40 is continuously provided for the plurality of stacked parts 20*a*.

When the base side fixing part 40 is continuously provided for the plurality of stacked parts 20*a*, it is also applicable that the ultrasonic welding is performed on each of the plurality of stacked parts 20*a* to form the base side fixing part 40 one by one. It is also applicable that the ultrasonic welding is collectively performed on the plurality of stacked parts 20*a* using a horn and an anvil each having a long-length pressure surface to simultaneously form the plurality of base side fixing parts 40. It is also applicable that at least one of a horn and an anvil is moved along the twisted wire 20 to continuously perform the ultrasonic welding on the plurality of stacked parts 20*a*, thus the plurality of base side fixing parts 40 are continuously formed.

When the plurality of base side fixing parts 40 are formed, only one of the plurality of electrical wires 22 in the twisted wire 20 as a whole may be fixed to the sheet member 30 via the plurality of base side fixing parts 40. Each of the plurality of electrical wires 22 may be fixed to the sheet member 30 via at least one base side fixing part 40. Specifically, the plurality of base side fixing parts 40 may include the base side fixing part 40 fixing one of the two electrical wires 22 to the sheet member 30 and the base side fixing part 40 fixing the other one of the two electrical wires 22 to the sheet member 30.

It is also applicable that a horn or an anvil having a groove corresponding to a width of the twisted wire 20 or the electrical wire 22 is used on a side of pressing the twisted wire 20 to perform the ultrasonic welding while preventing a deviation of the twisted wire 20 or the electrical wire 22 in a width direction.

A total thickness dimension T in the stacked part 20*a* is preferably smaller than a sum (t1+d×2) of an initial thickness dimension t1 of the sheet member 30 and a dimension (d×2) obtained by multiplying an initial diameter dimension d of the electrical wire 22 by the number of the plurality of stacked electrical wires 22 (two herein). Herein, the initial thickness dimension t1 of the sheet member 30 is a thickness dimension t1 of the sheet member 30 in a state before the electrical wire 22 is welded to the sheet member 30. A portion of the sheet member 30 where the electrical wire 22 is not welded keeps the initial thickness dimension t1. The initial diameter dimension d of the electrical wire 22 is a diameter dimension d of the electrical wire 22 in a state before the electrical wire 22 is welded to the sheet member 30. A portion of the electrical wire 22 not welded to the sheet member 30 keeps the initial diameter dimension d.

When the plurality of electrical wires 22 are simply stacked on the sheet member 30, a total thickness in that part is equal to a sum (t1+d×2) of the initial thickness dimension t1 of the sheet member 30 and the dimension (d×2) obtained by multiplying the initial diameter dimension d of the electrical wire 22 by the number of the plurality of stacked electrical wires 22 (two herein). Thus, the thickness of the stacked part is larger than the other part. Accordingly, the welding is performed to compress the stacked part 20*a*. Accordingly, the thickness dimension of the part of the wiring member 10 having the largest thickness can be reduced.

The total thickness dimension T in the stacked part 20*a* is preferably larger than a sum (t1+d) of the initial thickness dimension t1 of the sheet member 30 and the initial diameter dimension d of the electrical wire 22. Suppressed accordingly is that a cross-section area of the core wire 24 is excessively reduced and a thickness of the insulating covering 26 is excessively reduced.

In the example described above, in the base side fixing part 40, a portion of the plurality of electrical wires 22 having contact with the sheet member 30 is deformed more than the sheet member 30. That is to say, an interface between the sheet member 30 and the insulating covering 26 of the electrical wire 22 can be observed in a cross section of the base side fixing part 40. In the cross section, an amount of reduction in the thickness dimension of the sheet member 30 in the stacked part 20*a* with respect to the initial thickness dimension of the sheet member 30 can be grasped. An amount of reduction in the dimension of the electrical wire 22 welded to the sheet member 30 in the stacked direction with respect to the initial diameter dimension of the electrical wire 22 can be grasped. A state where the portion of the plurality of electrical wires 22 having contact with the sheet member 30 is deformed more than the sheet member 30 indicates that the amount of the latter reduction is larger than the amount of the former reduction, for example. It is also applicable that the sheet member 30 is not deformed but only the insulating covering 26 of the electrical wire 22 is deformed.

Accordingly, the sheet member 30 is kept in the original state as much as possible, and a protection function of the sheet member 30 is sufficiently achieved.

Figure 3:
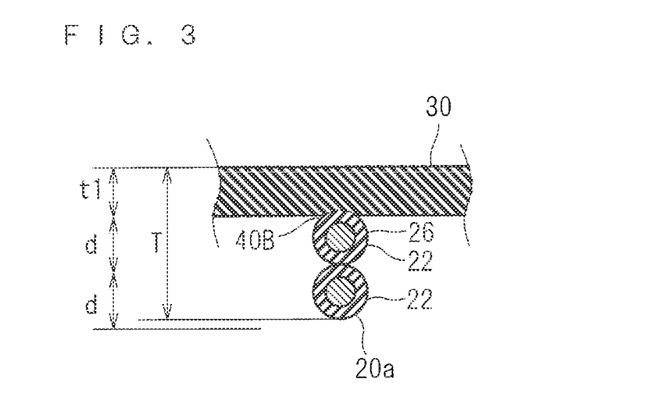
FIG. 3 is a schematic cross-sectional view illustrating a wiring member according to a modification example.

As illustrated in FIG. 3, it is also applicable that the sheet member 30 is deformed more than the portion of the plurality of electrical wires 22 having contact with the sheet member 30 in a base side fixing part 40B corresponding to the base side fixing part 40. That is to say, an interface between the sheet member 30 and the insulating covering 26 of the electrical wire 22 can be observed in a cross section of the base side fixing part 40B. In the manner similar to the above description, in the cross section, an amount of reduction in the thickness dimension of the sheet member 30 in the stacked part 20*a* with respect to the initial thickness dimension of the sheet member 30 can be grasped. An amount of reduction in the dimension of the electrical wire 22 welded to the sheet member 30 in the stacked direction with respect to the initial diameter dimension of the electrical wire 22 can be grasped. A state where the sheet member 30 is deformed more than the portion of the plurality of electrical wires 22 having contact with the sheet member 30 indicates that the amount of the former reduction is larger than the amount of the latter reduction, for example. It is also applicable that the insulating covering 26 of the electrical wire 22 is not deformed but only the sheet member 30 is deformed. In this case, the electrical wire 22 is partially embedded in the sheet member 30.

Accordingly, the insulating covering 26 is kept in the original state as much as possible, and an insulation function and a protection function of the insulating covering 26 are sufficiently achieved.

Also in this case, the total thickness dimension T in the stacked part 20*a* is preferably smaller than the sum (t1+d/2) of the initial thickness dimension t1 of the sheet member 30 and the dimension (d×2) obtained by multiplying the initial diameter dimension d of the electrical wire 22 by the number of the plurality of stacked electrical wires 22 (two herein). The total thickness dimension T in the stacked part 20*a* is preferably larger than the sum (t1+d) of the initial thickness dimension t1 of the sheet member 30 and the initial diameter dimension d of the electrical wire 22.

It can be adjusted in accordance with flexibility and a melting point of each material, for example, which of the sheet member 30 and the insulating covering 26 is more deformed. For example, the flexibility of the material can be adjusted by a ratio of a plasticizing agent even when a material having the same main component is used.

Figure 4:
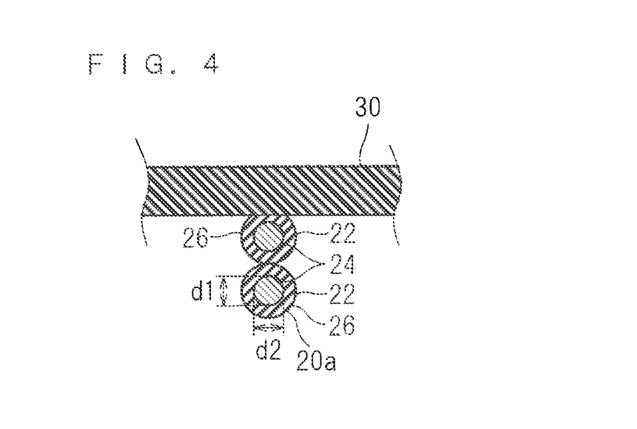
FIG. 4 is a schematic cross-sectional view illustrating a wiring member according to another modification example.

As illustrated in FIG. 4, the core wire 24 may have a flatter shape than the other portion in the stacked part 20a. That is to say, the core wire 24 of the initial electrical wire 22 is formed into a circular shape in cross section. The core wire 24 is compressed in the stacked direction when the plurality of electrical wires 22 are welded. Accordingly, the core wire 24 is formed into a flat shape so that stacked direction dimension d1 is smaller than a width direction dimension d2. The core wire 24 is also considered to have a flat shape with a small dimension in the thickness direction of the sheet member 30. Herein, the core wire 24 is formed into a flat shape together with the insulating covering 26. A portion of the electrical wire 22 other than the stacked part 20a is kept in the original circular shape in cross section or deformed to the extent of a lightly flat shape.

As described above, the configuration that the core wire 24 has the flatter shape than the other portion in the stacked part 20a contributes to the reduction in the total thickness dimension T described above.

Figure 5:
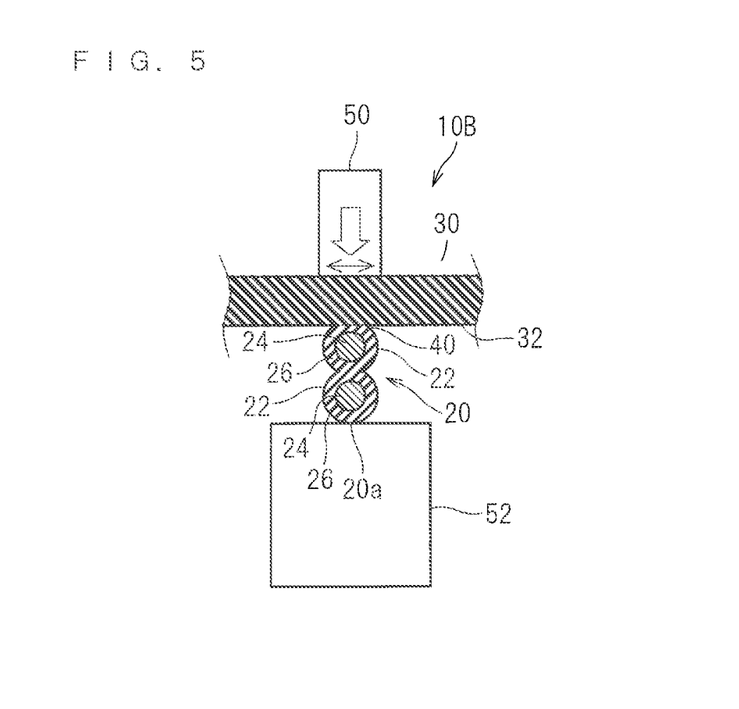
FIG. 5 is a schematic cross-sectional view illustrating a wiring member according to still another modification example.

In the description herein, the wiring member 10 includes the base side fixing parts 40 and 40B in which the portion of the plurality of electrical wires 22 having contact with the sheet member 30 is fixed to the sheet member 30, however, the wiring member may include a stacked fixing part 42 in which the plurality of electrical wires 22 are fixed to each other in the stacked part 20a as with a wiring member 10B according to a modification example illustrated in FIG. 5.

The stacked fixing part 42 may be formed at the same time as the process of sandwiching the sheet member 30 and the twisted wire 20 between the horn 50 and the anvil 52 for ultrasonic welding in the stacked part 20a to form the base side fixing part 40 described above. In this case, the stacked fixing part 42 can be formed by melting the resin of the insulating covering 26 of at least one of the plurality of electrical wires 22 to fix them. That is to say, the base side fixing part 40 is also the ultrasonic welding part.

That is to say, it is also applicable that the ultrasonic vibration energy is suppled while the horn 50 and the anvil 52 for ultrasonic welding sandwich the sheet member 30 and the twisted wire 20 to form only the base side fixing part 40 or form both the base side fixing part 40 and the stacked fixing part 42. The configuration is appropriately set in accordance with conditions such as an amount of the ultrasonic vibration energy to be supplied, which of sides of the sheet member 30 or the electrical wire 22 the ultrasonic vibration energy is suppled from, ease of ultrasonic welding of the resin of the base side fixing part 40 and the resin of the electrical wire 22, and ease of ultrasonic welding of the resins of the electrical wires 22, for example.

The insulating coverings 26 are deformed and welded to each other also in the stacked fixing part 42. Such a configuration also contributes to the reduction in the total thickness dimension T described above.

A configuration similar to that of fixing the twisted wire 20 to the sheet member 30 described above can also be applied to a configuration of fixing the electrical wire 28, and a configuration of fixing by ultrasonic welding can be applied, for example.

A connection member such as an electrical connector and an optical connector may be provided on an end portion of the twisted wire 20 and an end portion of the electrical wire 28. The wiring members 10 and 10B are connected to an electrical component and an optical component via the connection member, thus the wiring members 10 and 10B serve as wiring members connecting the plurality of electrical components and optical components.

According to the wiring members 10 and 10B having the above configuration, the plurality of electrical wires 22 are bundled to be the twisted wire 20, thus when the twisted wire 20 is fixed to the sheet member 30, the plurality of electrical wires 22 are fixed to the sheet member 30. Thus, the plurality of electrical wires 22 are fixed to the sheet member 30 easily compared with the case where the plurality of electrical wires separately follow the sheet member and are separately fixed to the sheet member 30.

The assembled wire 20 is the twisted wire 20 made up of the plurality of stranded electrical wires 22, thus when one of the plurality of electrical wires 22 is fixed on the main surface 32 of the sheet member 30, the plurality of electrical wires 22 can be fixed to the sheet member 30.

The main surface 32 of the sheet member 30 is flat, and the electrical wire 22 is stably fixed to the main surface 32 easily. Thus, in the stacked part 20a where the plurality of electrical wires 22 are stacked, the portion of the plurality of electrical wires 22 having contact with the sheet member 30 is fixed to the sheet member 30 in the base side fixing part 40, thus the plurality of electrical wires 22 can be stably fixed to the sheet member 30.

When the plurality of electrical wires 22 are also fixed by the stacked part 42 in the stacked part 20a, the plurality of electrical wires 22 can be fixed to the sheet member 30 more reliably.

The total thickness dimension T in the stacked part 20a of the plurality of electrical wires 22 is smaller than the sum (t1+d×2) of the initial thickness dimension t1 of the sheet member 30 and the dimension obtained by multiplying the initial diameter dimension d of the electrical wire 22 by the number of the plurality of stacked electrical wires 22, thus the maximum thickness dimension of the wiring members 10 and 10B can be reduced.

The total thickness dimension T in the stacked part 20a of the plurality of electrical wires 22 is larger than the sum (t1+d) of the initial thickness dimension t1 of the sheet member 30 and the initial diameter dimension d of the electrical wire 22, thus the electrical wire 22 can be prevented from being excessively crushed.

In the base side fixing part 40, when the portion of the plurality of electrical wires 22 having contact with the sheet member 30 is deformed, the sheet member 30 is kept in the original state as much as possible.

In the base side fixing part 40B, when the sheet member 30 is deformed more than the portion of the plurality of electrical wires 22 having contact with the sheet member 30, the electrical wire 22 is kept in the original state as much as possible.

When the core wire 24 has the shape flatter than the other portion in the portion where the plurality of electrical wires 22 are stacked, the thickness dimension of the wiring member 10 can be reduced also from this viewpoint.

Embodiment 2

Figure 6:
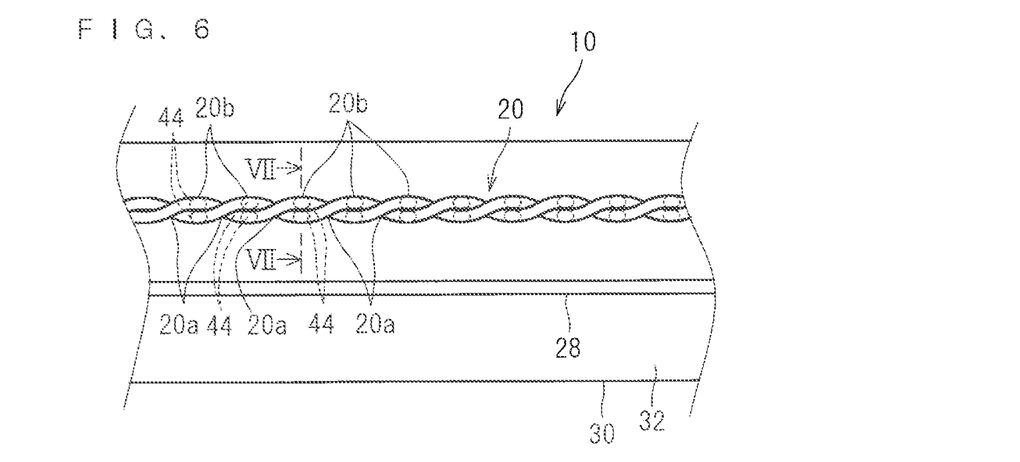
FIG. 6 is a schematic plan view illustrating a wiring member according to an embodiment 2.
Figure 7:
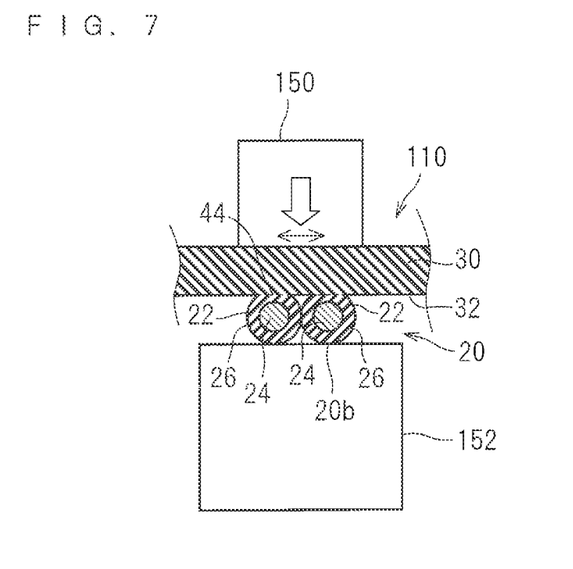
FIG. 7 is a schematic cross-sectional view along an VII-VII line in FIG. 6.

A wiring member 110 according to an embodiment 2 is described. FIG. 6 is a schematic plan view illustrating the wiring member 110, and FIG. 7 is a schematic cross-sectional view along a VII-VII line in FIG. 6. FIG. 7 illustrates a horn 150 and an anvil 152 for ultrasonic-welding the electrical wire 22 to the sheet member. In the description of the present embodiment, the same reference numerals are assigned to the similar constituent elements described in the embodiment 1 and the description thereof will be omitted, and a point of difference with the embodiment 1 is mainly described.

The wiring member 110 includes the assembled wire 20 and the base member 30.

As described in the embodiment 1, in the description hereinafter, the assembled wire 20 is the twisted wire 20, and the base member 30 is the sheet member 30.

The wiring member 10 and the wiring member 110 are different mainly in that the wiring member 110 includes a horizontal fixing part 44 in which the plurality of electrical wires 22 are fixed on the main surface 32 of the sheet member 30 in the portion where the plurality of electrical wires 22 are arranged side by side on the main surface 32 of the sheet member 30.

That is to say, the twisted wire 20 is disposed along the main surface 32 of the sheet member 30, thus when the wiring member 10 is observed from the direction perpendicular to the main surface 32, there are the stacked part 20a in which the plurality of electrical wires 22 intersect with each other and stacked on the main surface 32 of the sheet member 30 and the parallel part 20b in which the plurality of electrical wires 22 are disposed in the parallel state, the stacked part 20a and the parallel part 20b extending alternately on the main surface 32.

In the parallel part 20b, the plurality of electrical wires 22 are arranged side by side on the main surface 32, thus the plurality of (two herein) electrical wires 22 are located in positions where the plurality of electrical wires 22 can have contact with the main surface 32 of the sheet member 30. In the parallel part 20b, the plurality of electrical wires 22 may or may not alternately contact with each other. It is also applicable that a portion of the twisted wire 20 fixed to the sheet member 30 is stranded back to elongate a portion where the plurality of electrical wires 22 are disposed in a parallel state and can have contact with the main surface 32 of the sheet member 30.

In the parallel part 20b, the plurality of electrical wires 22 arranged side by side are fixed to the sheet member 30, thus the horizontal fixing part 44 is formed.

The horizontal fixing part 44 can be formed by sandwiching the plurality of electrical wires 22 and the sheet member 30 arranged side by side between the horn 50 and the anvil 52 for ultrasonic welding to supply ultrasonic vibration energy in the parallel part 20b and melting the resin in at least one of the plurality of electrical wires 22 and the sheet member 30 to fix the electrical wires 22 and the sheet member 30, for example. That is to say, the horizontal fixing part 44 is also the ultrasonic welding part.

It is optionally determined whether the horn 50 supplying the ultrasonic vibration and the receiving side anvil 52 are provided on the side of the sheet member 30 or the side of the twisted wire 20. One of the horn 50 and the anvil 52 may be pressurized, or both of them may be pressurized. When the horn 50 or the anvil 52 is pressurized from the side of the sheet member 30, the pressurized portion of the lower surface of the sheet member 30 may be partially concaved.

The plurality of electrical wires 22 are arranged side by side in the parallel part 20b, thus the twisted wire 20 is concaved more than the stacked part 20a in the parallel part 20b. Thus, it is sufficient that the horn 50 and the anvil 52 are highly pressurized and come close to each other compared with the case in the embodiment 1.

The plurality of electrical wires 22 are arrange side by side in the parallel part 20b, thus the plurality of electrical wires 22 can have stably contact with the main surface 32 of the sheet member 30. Thus, the plurality of electrical wires 22 are stably fixed on the main surface 32 of the sheet member 30 easily.

The plurality of parallel parts 20b described above are linearly provided side by side at intervals in the extension direction of the twisted wire 20. It is also applicable that the horizontal fixing part 44 is formed in only one of the plurality of parallel parts 20b or in two or more of the plurality of parallel parts 20b. In the latter case, it is also applicable that the horizontal fixing part 44 is continuously provided in the plurality of parallel parts 20b without an intervention of a portion where the horizontal fixing part 44 is not provided, or the horizontal fixing part 44 is provided for each of the plurality of parallel parts 20b. FIG. 6 illustrates a configuration where the horizontal fixing part 44 is continuously provided in the plurality of parallel parts 20b.

When the plurality of horizontal fixing parts 44 are provided, the ultrasonic welding is performed on each of the plurality of parallel parts 20b to form the horizontal fixing part 44 one by one. It is also applicable that ultrasonic welding is collectively performed on the plurality of parallel parts 20b using a horn or an anvil having a plurality of pressure parts protruding at intervals of integral multiple of a pitch of the parallel part 20b to simultaneously form the plurality of horizontal fixing parts 44. It is also applicable that at least one of a horn and an anvil is moved along the twisted wire 20 and the pressure is applied and the ultrasonic vibration energy are supplied from the horn and the anvil in the parallel part 20b to be processed to form the plurality of horizontal fixing parts 44 in series.

It is also applicable that a horn or an anvil having a groove corresponding to a width of the twisted wire 20 or the electrical wire 22 is used on a side of pressing the twisted wire 20 to perform the ultrasonic welding while preventing a deviation of the twisted wire 20 or the electrical wire 22 in a width direction.

According to the wiring member 110 having the above configuration, the plurality of electrical wires 22 are bundled to be the twisted wire 20, thus when the twisted wire 20 is fixed to the sheet member 30, the plurality of electrical wires 22 are fixed to the sheet member 30. Thus, the plurality of electrical wires 22 can be fixed to the sheet member 30 easily compared with the case where the plurality of electrical wires separately follow the sheet member and are separately fixed to the sheet member 30.

The assembled wire 20 is the twisted wire 20 made up of the plurality of stranded electrical wires 22, thus when one of the plurality of electrical wires 22 are fixed on the main surface 32 of the sheet member 30, the plurality of electrical wires 22 can be fixed to the sheet member 30.

The plurality of electrical wires 22 are fixed to the sheet member 30 in the horizontal fixing part 44 in the parallel part 20b in which the plurality of electrical wires 22 are arranged side by side, thus the plurality of electrical wires 22 can be fixed to the sheet member 30 more reliably.

In the description in the present embodiment, the plurality of electrical wires 22 are fixed to the sheet member 30 in the horizontal fixing part 44, however, the base side fixing part 40 in the embodiment 1 and the horizontal fixing part 44 in the embodiment 2 may be mixedly located. The base side fixing part 40 and the stacked fixing part 42 in the embodiment 1 and the horizontal fixing part 44 in the embodiment 2 may be mixedly located.

Figure 8:
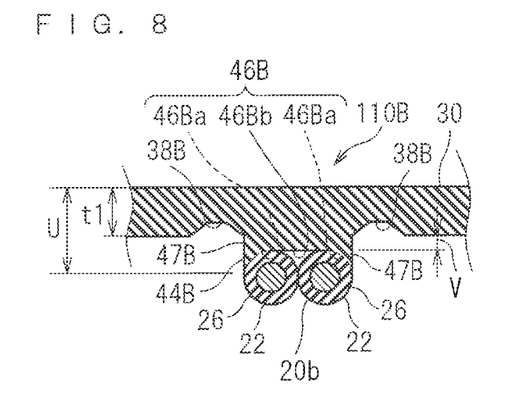
FIG. 8 is a schematic cross-sectional view illustrating a wiring member according to a modification example.

FIG. 8 is a schematic cross-sectional view illustrating a wiring member 110B according to the embodiment 2. As described in the present modification example, a largest thickness dimension U in a horizontal fixing part 44B corresponding to the horizontal fixing part 44 described above in the sheet member 30 may be larger than the initial thickness dimension t1 of the sheet member 30.

That is to say, the horizontal fixing part 44B protrudes more than the main surface of the sheet member 30. The electrical wire 22 is disposed on a main surface 46B of the horizontal fixing part 44B. The main surface 46B is welded to the insulating covering 26 of the electrical wire 22.

More specifically, the horizontal fixing part 44B is formed to have a width dimension corresponding to a width dimension of the configuration that the plurality of electrical wires 22 are arranged side by side. Both side portions of the horizontal fixing part 44B are defined as vertical surfaces 47B protruding with a vertical posture from the sheet member 30. The both side portions of the horizontal fixing part 44B may be inclined with respect to the sheet member 30. The pair of vertical surfaces 47B extend toward an outer edge portion of the plurality of electrical wires 22 arranged side by side. Herein, in a portion where the vertical surface 47B reaches an outer edge portion of the electrical wire 22, a portion having the largest thickness dimension U in the horizontal fixing part 44B in the sheet member 30 may occur.

The main surface 46B described above is formed on outward portion between the pair of vertical surfaces 47B. The both side portions in the main surface 46B are formed to be curved surfaces 46Ba each curved in accordance with an outer peripheral shape of the insulating covering 26. Herein, the curved surface 46Ba has a partial curved surface of approximately a quarter of a circumferential surface. The insulating covering 26 is welded to the curved surface 46Ba. A central portion 46Bb in a width direction in the main surface 46B is formed to have a surface parallel to the main surface of the sheet member 30.

The curved surface 46Ba described above can be observed as an interface surface for the welding of the insulating covering 26 and the horizontal fixing part 44B. The curved surface 46Ba has a shape closer to the circumferential surface shape of the insulating covering 26 than the shape of the main surface of the sheet member 30 where the electrical wire 22 is not disposed. This is caused by a condition where a deformation amount of the sheet member 30 is larger than that of the insulating covering 26.

The electrical wire 22 is supported on the sheet member 30 in a position of the end portion on a side of the central portion 46Bb in the width direction in the curved surface 46Ba. Herein, the central portion 46Bb in the width direction in the main surface 46B protrudes more than the main surface of the sheet member 30. Thus, the electrical wire 22 is supported in a position a dimension V away from the main surface of the sheet member 30.

A lateral part of the electrical wire 22 is concave in the main surface in the sheet member 30. This concave portion is referred to as a concave portion 38B hereinafter. The horizontal fixing part 44B described above is formed by bringing the portion of the original sheet member 30 located in the concave portion 38B close to the electrical wire 22 at the time of welding.

According to this wiring member 110B, the horizontal fixing part 44B protrudes from the main surface of the sheet member 30 and is welded to the plurality of electrical wires 22. Thus, the parallel part 20b is easily welded to the sheet member 30. Furthermore, the horizontal fixing part 44B is deformed to have the curved surface 46Ba in accordance with the outer peripheral shape of the electrical wire 22 and welded to the electrical wire 22. Thus, a region of welding the electrical wire 22 and the horizontal fixing part 44B can be increased while suppressing the deformation of the electrical wire 22, and the electrical wire 22 is welded to the sheet member 30 more tightly.

As described above, the plurality of electrical wires 22 are fixed to the sheet member 30 more tightly in combination with the configuration that the plurality of electrical wires 22 are welded to the sheet member 30 in the stacked part 20a.

Described is an example of a manufacturing method of welding the parallel part 20b of the plurality of electrical wires 22 to the sheet member 30.

Figure 9:
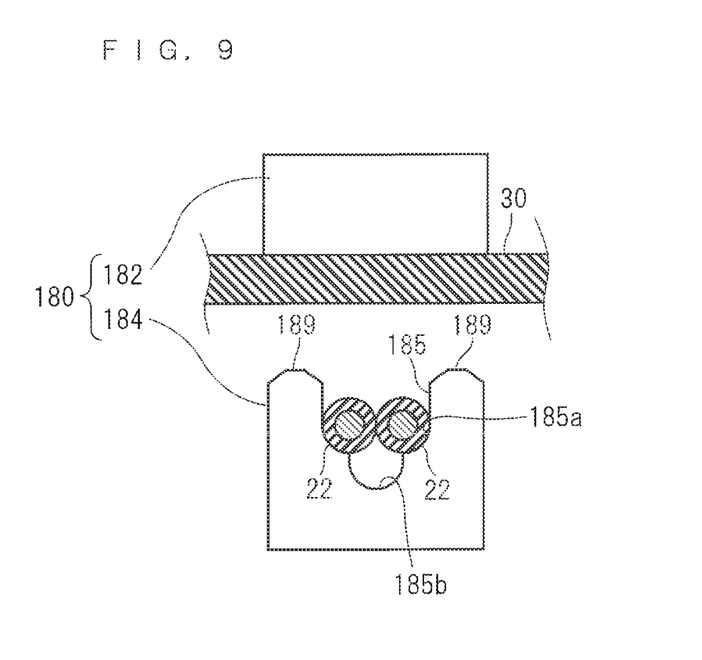
FIG. 9 is an explanation drawing illustrating an example of a manufacturing method of a wiring member according to a modification example.
Figure 10:
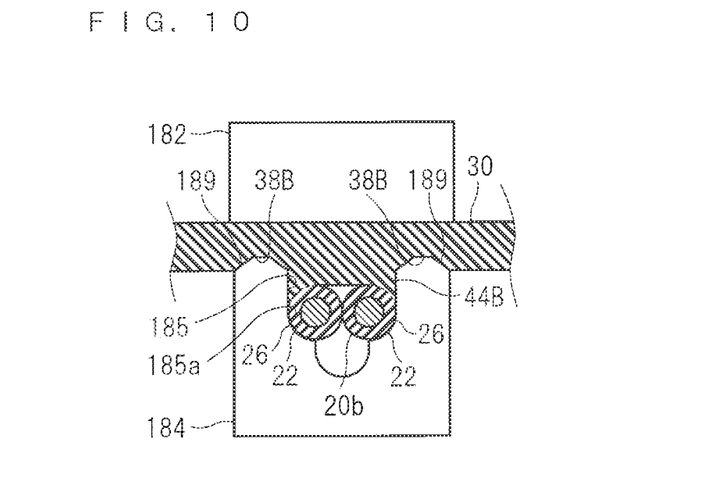
FIG. 10 is an explanation drawing illustrating an example of a manufacturing method of a wiring member according to a modification example.

Herein, as illustrated in FIG. 9 and FIG. 10, the plurality of electrical wires 22 and the sheet member 30 are ultrasonic-welded by an ultrasonic welding machine 180. The ultrasonic welding machine 180 includes a horn 182 and an anvil 184.

The horn 182 is a member providing ultrasonic vibration for a work having contact with the horn 182. The anvil 184 is a member supporting the work with the horn 182 from an opposite side thereof. Accordingly, the sheet member 30 and the plurality of electrical wires 22 to be welded in the work are sandwiched between the horn 182 and the anvil 184, thereby being provided with the ultrasonic vibration and welded.

More specifically, the sheet member 30 and the plurality of electrical wires 22 are sandwiched by the horn 182 and the anvil 184 while the plurality of electrical wires 22 is disposed on the sheet member 30 along a predetermined route.

For example, the horn 182 has a pressing surface wider than the parallel part 20b. The pressing surface is set to have a width dimension larger than a width dimension including the parallel part 20b and the concave portion 38B.

A holding groove 185 holding the plurality of electrical wires 22 is formed in a portion of the anvil 184 facing a side of the horn 182. Herein, the holding groove 185 includes a wide holding part 185a which can hold the parallel part 20b. The wide holding part 185a holds the plurality of electrical wires 22 in a parallel state. Herein, a central holding part 185b which can hold one electrical wire 22 is formed on a back side of a center of the holding groove 185 in a width direction. Thus, one of the plurality of stacked electrical wires 22 can be disposed on the central holding part 185b and the other electrical wire 22 can be disposed in the wide holding part 185a. Accordingly, the plurality of electrical wires 22 are housed in the holding groove 185 in a stacked state.

A pressing part 189 pressing the portion of the sheet member 30, which is to be the concave portion 38B, with the horn 182 is formed on a lateral part of the holding groove 185.

The pressing part 189 protrudes more than the electrical wire 22 in a state where the electrical wire 22 is housed in the holding groove 185. In other words, the electrical wire 22 is housed closer to a back side in the holding groove 185 in relation to a tip end portion of the pressing part 189. Herein, an outward portion and an inward portion of the pressing part 189 are formed to each have an inclined surface. Accordingly, the pressing part 189 is gradually narrowed toward a tip end side thereof. The inward portion of the pressing part 189 preferably has a shape inclined toward a back side and a center of the holding groove 185 in a width direction. Accordingly, a portion of the sheet member 30 pressed by the pressing part 189 is easily brought close to an inner side of the holding groove 185.

Then, the horn 182 supplies the ultrasonic vibration to the plurality of electrical wires 22 and the sheet member 30 sandwiched by the horn 182 and the anvil 184. Frictional heat caused by the ultrasonic vibration is generated in the portion where the insulating covering 26 and the sheet member 30 have contact with each other, and at least one of them is melted, thus they are joined to each other. At this time, a portion of the sheet member 30 pressed by the pressing part is brought close to the parallel part 20*b* of the electrical wire 22. Accordingly, the horizontal fixing part 44B described above is formed, and the parallel part 20*b* of the electrical wire 22 is welded to the horizontal fixing part 44B. As described above, the sheet member 30 is preferably softer than the insulating covering 26 at least at the time of the ultrasonic welding.

When the horn 182 and the anvil 184 are formed to each have a length including the parallel part 20*b* and the plurality of stacked parts 20*a* of the plurality of electrical wires 22, the parallel part 20*b* and the plurality of stacked parts 20*a* of the plurality of electrical wires 22 can also be welded to the sheet member 30 at the same time.

Figure 11:
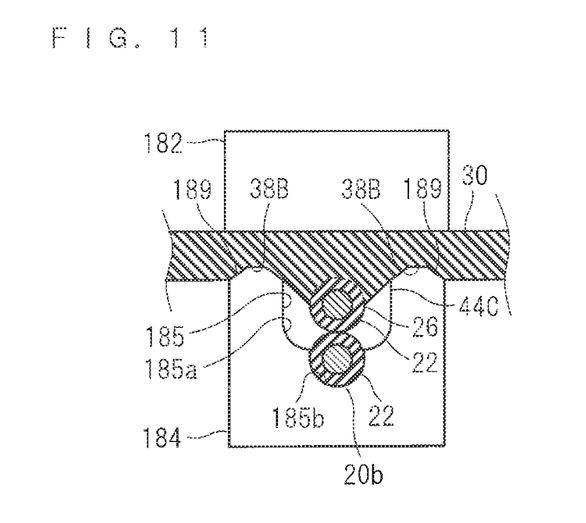
FIG. 11 is an explanation drawing illustrating an example of a manufacturing method of a wiring member according to a modification example.

In the stacked part 20*a*, as illustrated in FIG. 11, the ultrasonic welding is performed in a state where the plurality of electrical wires 22 are housed in the central holding part 185*b* and the wide holding part 185*a* in the holding groove 185 in the stacked state. At this time, a lateral part of the sheet member 30 with respect to the stacked part 20*a* is also brought close to the stacked part 20*a* by the pressing part 189. Thus, a base side fixing part 40C corresponding to the base side fixing part 40 protrudes more than the sheet member 30 and is welded to the electrical wire 22 in the manner similar to the horizontal fixing part 44B. At this time, the base side fixing part 40C is deformed to have a shape following the outer peripheral curved surface of the electrical wire 22, and welded to the electrical wire 22 in a welding region as large as possible.

The parallel part 20*b* and the stacked part 20*a* may be separately welded to the sheet member 30.

Embodiment 3

Figure 12:
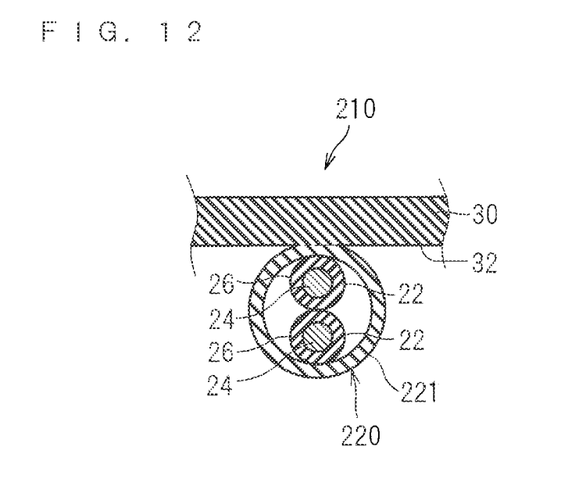
FIG. 12 is a schematic cross-sectional view illustrating a wiring member according to an embodiment 3.

A wiring member 210 according to an embodiment 3 is described. FIG. 12 is a schematic cross-sectional view illustrating the wiring member 210. In the description of the present embodiment, the same reference numerals are assigned to the similar constituent elements described in the embodiment 1 and the description thereof will be omitted, and a point of difference with the embodiment 1 is mainly described.

The wiring member 210 includes an assembled wire 220 and the base member 30.

The assembled wire 220 is made up of a plurality of bundled wire-like transmission members 22.

It is sufficient that the wire-like transmission member 22 is a wire-like member transmitting electrical power or light as described in the embodiment 2. In the description herein, the wire-like transmission member 22 is the electrical wire 22 in the manner similar to the embodiment 2.

The assembled wire 220 includes a covering member 221 covering the plurality of electrical wires 22. The covering member 221 covers the outer periphery of the plurality of electrical wires 22 in a state where the plurality of electrical wires 22 are bundled to have one wire like shape. Accordingly, the covering member 221 keeps the plurality of electrical wires 22 in a bundled state.

The covering member 221 keeps the plurality of electrical wires 22 in the bundled state, thus a form of the plurality of electrical wires 22 in the covering member 221 is optionally set. In the covering member 221, the plurality of electrical wires 22 may be stranded, or may not be stranded but extend in a parallel state.

It is sufficient that the covering member 221 covers the plurality of electrical wires 22 and keeps them in a bundled form. For example, the covering member 221 may be resin extrusion-covering around the plurality of assembled electrical wires 22 like a wire. The covering member 221 may be an adhesive tape wound around the plurality of electrical wires 22 or a tube member such as a corrugated tube externally mounted around the plurality of electrical wires 22. In the description herein, the covering member 221 is the resin (also referred to as a sheath) extrusion-covering around the plurality of assembled electrical wires 22. like a wire A shield layer made up of a braid or a metal tape, for example, may be provided in an inner side or an inner periphery of the covering member 221.

The base member 30 is a member similar to that in the embodiment 1 described above. In the description herein, the base member 30 is the sheet member 30 similar to that in the embodiment 1 described above.

The covering member 221 of the assembled wire 220 is fixed on the main surface 32 of the sheet member 30.

Applicable as the configuration of fixing the covering member 221 on the main surface 32 of the sheet member 30 is a configuration similar to that of fixing the insulating covering 26 of the electrical wire 22 in the twisted wire 20 on the main surface 32 of the sheet member 30. In the description herein, the covering member 221 is fixed by the ultrasonic welding.

According to the wiring member 210 having the above configuration, when the assembled wire 220 is fixed to the sheet member 30, the plurality of electrical wires 22 are fixed to the sheet member 30. Thus, the plurality of electrical wires 22 can be fixed to the sheet member 30 easily compared with the case where the plurality of electrical wires separately follow the sheet member and are separately fixed to the sheet member 30.

The assembled wire 220 is made up of the plurality of electrical wires 22 covered by the covering member 221 and thereby bundled, thus when the covering member 212 of the assembled wire 220 is fixed on the main surface 32 of the sheet member 30, the plurality of electrical wires 22 can be fixed to the sheet member 30.

Modification Example

In each embodiment and each modification example described above, the route of the assembled wire needs not be straight, however, the assembled wire may be fixed on the main surface of the base member along a curved route.

A soundproof member or a shield member, for example, may be overlapped with the sheet member 30 described above.

Each configuration described in the embodiment and each modification example can be appropriately combined as long as they are not contradictory.

EXPLANATION OF REFERENCE SIGNS

10, 10B wiring member
20 twisted wire (assembled wire)

20a stacked part
20 parallel part
22 electrical wire (wire-like transmission member)
24 core wire
26 covering
28 electrical wire (additional wire-like transmission member)
30 sheet member (base member)
32 main surface
38B concave portion
40, 40B, 40C base side fixing part
42 stacked fixing part
44, 44B horizontal fixing part
46B main surface
46Ba curved surface
46Bb central portion in width direction
47B vertical surface
50 horn
52 anvil
110, 110B wiring member
15 horn
152 anvil
180 ultrasonic welding machine
182 horn
184 anvil
185 holding groove
185a wide holding part
185b central holding part
189 pressing part
210 wiring member
220 assembled wire
22 covering member
T total thickness dimension
U thickness dimension
d initial diameter dimension
d1 dimension
d2 width direction dimension
t1 initial thickness dimension

The invention claimed is:

1. A wiring member, comprising:
an assembled wire made up of a plurality of wire-like transmission members which are bundled,
wherein the assembled wire comprises a twisted wire made up of the plurality of wire-like transmission members which are stranded;
a base member having a main surface, wherein
at least one of the plurality of wire-like transmission members is fixed on the main surface of the base member so as to fix the assembled wire to the base member; and
a base side fixing part defined by a portion of the at least one of the plurality of wire-like transmission members that is fixed on and in contact with the main surface of base member,
wherein,
in the base side fixing part, the portion of the at least one of the plurality of wire-like transmission members that is in contact with the base member is deformed more than the base member, and
the base side fixing part is an ultrasonic welding part.

2. The wiring member according to claim 1, wherein
a total thickness dimension in a portion where the plurality of wire-like transmission members are stacked is smaller than a sum of an initial thickness dimension of the base member and a dimension obtained by multiplying an initial diameter dimension of one of the plurality of wire-like transmission members by a total number of the plurality of wire-like transmission members which have been stacked.

3. The wiring member according to claim 1, wherein
a total thickness dimension in a portion where the plurality of wire-like transmission members are stacked is larger than a sum of an initial thickness dimension of the base member and an initial diameter dimension of one of the plurality of wire-like transmission members.

4. The wiring member according to claim 1,
wherein, in the portion where the plurality of wire-like transmission members are stacked, the base side fixing part is defined by the portion of the plurality of wire-like transmission members that is in contact with the base member.

5. The wiring member according to claim 1, further comprising
a stacked fixing part in which the plurality of wire-like transmission members are fixed to each other in the portion where the plurality of wire-like transmission members are stacked.

6. The wiring member according to claim 1, wherein
the plurality of wire-like transmission members include an electrical wire having a core wire and a covering around the core wire, and
the core wire has a shape flatter than another portion in the portion where the plurality of wire-like transmission members are stacked.

7. The wiring member according to claim 1, further comprising
a horizontal fixing part in which the plurality of wire-like transmission members are fixed to the base member in a portion where the plurality of wire-like transmission members are arranged side by side.

8. The wiring member according to claim 7, wherein
a largest thickness dimension of the horizontal fixing part in the base member is larger than an initial thickness dimension of the base member such that the horizontal fixing part protrudes beyond the main surface of the base member in a direction extending from the main surface of the base member and towards the plurality of wire-like transmission members.

9. The wiring member according to claim 8, wherein
a lateral part of the main surface of the base member with respect to one of the wire-like transmission members is concaved.

* * * * *